United States Patent [19]
Adler et al.

[11] 3,853,405
[45] Dec. 10, 1974

[54] HEAT OR LIGHT SOURCE TRACKING DEVICE

[75] Inventors: Fred P. Adler, Los Angeles; William A. Craven, Jr., Culver City, both of Calif.

[73] Assignee: Hughes Aircraft Company, Culver City, Calif.

[22] Filed: Sept. 4, 1956

[21] Appl. No.: 608,649

[52] U.S. Cl. ............................... 356/152, 250/233
[51] Int. Cl. .............................................. G01s 3/78
[58] Field of Search ........... 250/200, 203, 206, 207, 250/83, 71, 83.3, 83.6, 83.3 IR, 232, 233, 234; 318/18, 313, 480; 88/1 M, 1 L, 108, 1 HU; 244/14.3, 14.4, 3.16; 356/141, 152

[56] References Cited
UNITED STATES PATENTS

| | | | |
|---|---|---|---|
| 1,562,757 | 11/1925 | Hammond | 96/45 |
| 2,403,066 | 7/1946 | Evans | 178/6.8 |
| 2,431,625 | 11/1947 | Tolson | 244/3.16 |
| 2,517,702 | 8/1950 | Offner | 244/3.16 |
| 2,528,020 | 10/1950 | Sunstein | 250/201 |
| 2,659,828 | 11/1953 | Elliott | 250/201 |
| 2,713,134 | 7/1955 | Eckweiler | 318/19 |
| 2,715,364 | 8/1955 | Buck et al. | 244/3.16 |
| 2,774,961 | 12/1956 | Orlando | 340/258 |
| 2,825,021 | 2/1958 | Friend | 244/3.16 |
| 2,981,843 | 4/1961 | Hasen | 250/203 |

FOREIGN PATENTS OR APPLICATIONS

| | | | |
|---|---|---|---|
| 33,746 | 9/1934 | Netherlands | 250/203 |

*Primary Examiner*—Richard A. Farley
*Attorney, Agent, or Firm*—W. H. MacAllister; Noel B. Hammond

EXEMPLARY CLAIM

1. A radiant energy device for indicating when a predetermined axis is in line with a source of radiant energy and comprising in combination, a rotatable optical system having an axis of rotation and an optical axis for focusing an image of said source upon a plane disposed substantially perpendicular thereto, said optical system being disposed with said axis of rotation passing through a predetermined point in said plane perpendicular thereto and with said optical axis nonparallel to said axis of rotation and passing through said plane, means for rotation of said optical system coupled thereto for causing said image to traverse a circular path, a reticle disposed substantially in said plane and having a center point coincident with said axis of rotation, said reticle including means for amplitude modulating the radiant energy passing therethrough as said image traverses said circular path, the amplitude of modulation being in proportion to the displacement of the center of said circular path from the center point of said reticle, and a radiant energy detector axially aligned with said reticle and being responsive to the amplitude modulated radiant energy passing through said reticle to develop an output signal indicative of the concentricity of said circular path with respect to said axis of rotation.

7 Claims, 9 Drawing Figures

PATENTED DEC 10 1974 3,853,405

INVENTORS.
Fred P. Adler,
William A. Craven Jr.,

BY

ATTORNEY.

INVENTORS.
Fred P. Adler,
William A. Craven Jr,

BY

ATTORNEY.

3,853,405

INVENTORS.
Fred P. Adler,
William A. Craven Jr.,
BY

ATTORNEY.

HEAT OR LIGHT SOURCE TRACKING DEVICE

The present invention relates to radiant energy systems, and particularly to systems which utilize radiant energy to provide directional control.

Radiant energy controlled systems provide essential control functions in positioning and directional guidance equipment. These functions can be performed automatically providing the location of the source of radiant energy can be determined. In particular, a predetermined axis may be made to point continuously at the source of radiant energy. Although it appears to be more practical to utilize a portion of the radiant energy emitted by a target to provide tracking information than to direct radiant energy toward a target and then utilize a portion of the reflected energy, many problems are encountered in utilizing the energy emitted by a target to provide guidance information. The wavelength of the radiant energy which can be used must be selected in accordance with the emission characteristics of the source, and also the transmission characteristics of the medium through which the radiant energy is to be transmitted must be determined. The detection of the radiant energy of the particular wavelength or band of wavelengths selected can be accomplished by a number of well known techniques using materials sensitive to the particular wavelengths. By using the proper combination of radiant energy filter, it is also possible to limit the tracking system to a particular waveband and thus provide target discrimination. As has been mentioned, the detection of radiant energy is quite easily accomplished, but many serious problems exist in the utilization of the energy derived from a radiant energy source in effecting rapid and accurate control functions.

One particular application of radiant energy controlled systems is in guided missiles. Such systems are particularly useful in this field since a missile which utilizes energy emitted by the target is relatively immune to counter-measures, especially when the wavelength of the radiant energy utilized is carefully selected. A further advantage of radiant energy guided missiles is that no energy radiating device is needed, either at the point of launch or within the missile, as is the case with radar guided missiles.

One device which has been used in radiant energy guidance systems utilizes a rotating episcotister, or reticle, placed in the focal plane of an optical system with the optical system being directed towards the radiant energy source to produce an image of the source upon the reticle. The rotating reticle has wedge shaped spokes of alternately high and low radiant energy transmissivity which cause an audiofrequency variation in the radiant energy passing through the reticle. Superimposed on the reticle is an optical density wedge which causes a variation in the radiant energy passing through the reticle whenever the target image is displaced from the center of the reticle. A radiant energy sensitive device is placed in the path of the energy passing through the reticle to produce a corresponding electrical signal which can be used for guidance and control functions. This system has the disadvantage of relatively poor background discrimination for backgrounds of relatively high radiance, since such a background will result in a slight imaging of the reticle upon the detector. As this shadow of the reticle moves about the detector, spurious signals may be generated which may be detrimental to tracking accuracy. A further disadvantage of this system is that the interrupting action, or chopping action of the reticle, is impaired for relatively small error angles. In fact, it can be shown that whenever any part of the target image overlaps the center of the reticle, when the image is circular, no output signal is produced. Thus a dead spot or area of zero signal information is present.

In another system which has been used, a stationary reticle is placed in the optical path of a detector, and a tilted optical system is rotated to cause the target image to move in a circular path about the reticle. In one system of this type the circular path described by the image is made just slightly smaller than the circumference of the reticle, and thus when the circular path described by the target image is displaced the image falls off the reticle and a discontinuity of output signal results. This is in effect a discontinuous amplitude modulation of the carrier signal produced by areas of zero and unity energy transmissivity of the reticle. This system has the disadvantage of being substantially an on-off system which produces non-linear error response characteristics. A further disadvantage of this system is that the error characteristic is dependent upon the image size and shape which is extremely undesirable for guided missile application since the tracking accuracy will deteriorate at short ranges where the image size becomes large.

Systems have also been devised which utilize the interaction of a rotating reticle and a rotating optical system to produce the necessary variations of radiant energy to provide tracking information. This type of system suffers from the disadvantage of complex mechanical construction.

It is, therefore, an object of this invention to provide an improved radiant energy guidance system which provides tracking information of greater accuracy than the devices of the prior art.

Another object of this invention is to provide an improved radiant energy tracking device which is capable of providing a wide variety of useful signals which are proportional to the angular location of a source of radiant energy.

It is a further object of this invention to provide a radiant energy guidance unit having linear signal characteristics irrespective of the size of the radiant energy source or of the background surrounding the radiant energy source.

The radiant energy tracking device provided in accordance with the present invention utilizes a rotating or nutating optical system to focus an image of the target source upon a reticle (or modulator) which is disposed in the optical path between the optical system and a radiant energy detector. The reticle is so constructed that an amplitude modulation of the radiant energy passing through it is produced which is proportional to the relationship of the circular path described by the image and the center of the reticle. This amplitude modulation is produced as the target image moves in a predetermined path about a radial gradation pattern which is part of the reticle and is so designed that the radiant energy transmissivity of each area of the pattern is proportional to the distance of that area from the center point of the pattern. In addition to providing target information, this radial gradation pattern, in conjunction with the nutation of the target image, increases the lock-on angle for acquirement of the target over that obtainable with a rotating reticle system. A second pattern, which may be termed a checkerboard pattern, is included in the reticle to produce a higher audio-frequency interception of the radiant energy passing through the reticle, and thus provide a carrier wave for the modulation produced by the radial gradation. By proper design of the checkerboard pattern, this carrier frequency is made substantially constant for all circular paths described by the image. This effect is achieved by the careful spacing of a plurality of relatively opaque areas in substantially concentric circles about the center of the reticle. The detector device which is sensitive to the radiant energy passing through the reticle is then utilized to produce an electrical signal which is responsive to the amplitude modulated radiant energy. These output signals from the detector device can then be utilized by servomechanisms to direct the optical system toward the source of radiant energy and correct for the existing error. These signals can likewise be used for a number of purposes, including the steering of a missile toward a target.

In addition to providing a constant frequency interruption of the radiant energy passing through the reticle, the checkerboard pattern described above very greatly reduces the signal due to extended targets, such as bright clouds, and thus makes possible the selection of a target when there is a background of high radiance. It also insures tracking accuracy at close range where the image size increases.

The present invention makes possible the use of automatic gain control which improves the lock-on characteristics of the system and also provides target discrimination when one or more sources of radiant energy lie substantially in the path of the guidance unit. This allows a measure of target angular position that is independent of the target radiant intensity. In addition, the present invention makes evident many possible ways of producing a wide variety of output signal characteristics which are dependent upon the precise location of a source of radiant energy. For purposes of illustration, the embodiments illustrated in the drawings and described are for a radiant energy tracking device which is sensitive only to radiant energy in the near infrared region. However, it is to be understood that the principles taught by the invention are not limited to radiant energy of this wavelength.

The novel features of this invention, as well as the invention itself, will best be understood from the following description taken in conjunction with the accompanying drawings and in which:

FIG. 3b is a graph illustrating the relative transmissivity of the radial gradation pattern illustrated in FIG. 3a;

Figure 1:
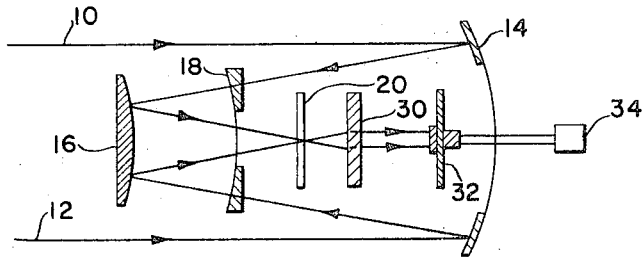
FIG. 1 is a diagrammatic representation of a guidance system incorporating the present invention and illustrating the general arrangement of the elements of the system.

In FIG. 1, the relative position of the optical elements and the position of the detector are shown schematically. Two arrows 10 and 12 are shown to illustrate the path taken by radiant energy emitted by the target. The radiant energy is first reflected by a concave primary mirror 14 and directed to a secondary mirror 16 which is essentially a convex mirror. Disposed in the optical path between the primary mirror 14 and the secondary mirror 16 is a corrector lens 18 which refracts the radiant energy by the amount necessary to correct for aberrations caused by the primary mirror 14 and the secondary mirror 16. The radiant energy from the secondary mirror 16 is focused substantially in the plane of a reticle 20 which is utilized to alter the radiant energy in a manner such that the radiant energy passing through the reticle 20 contains signal information concerning the location of the source of radiant energy. The radiant energy which passes through the reticle 20 is directed upon a radiant energy detector 32 by a field lens and filter 30. This field lens 30 spreads the radiant energy evenly about the surface of the radiant energy detector device 32 to prevent the generation of spurious signals which might arise as a result of variations in sensitivity between different areas of the detector. In one guidance unit which is now in use, the field lens 30 is constructed of germanium and the radiant energy detector 32 is composed of lead sulfide. This arrangement makes the tracking system sensitive only to radiation having a wavelength between 1.8 and 2.7 microns, since the lead sulfide detector is not sensitive at wavelengths greater than approximately 2.7 microns, and the germanium acts as a filter by eliminating radiation at wavelengths less than 1.8 microns. This filtering further helps the guidance unit to distinguish between the radiation from bright clouds (most of which lies at 1.8 microns) and that from an engine (most of which lies above 1.8 microns). This is extremely useful in guided missiles which are utilized against aircraft. This particular filtering system also greatly reduces the effect of sunlight which might be reflected from a false target, and thus tends to make the guidance system equally effective day or night.

A signal utilization device 34 is shown as being coupled with the radiant energy detector 32 and is responsive to the output signals from the radiant energy detector 32. The signal utilization device 34 may include a number of servomechanisms which can be used to per-form many important functions for directional control. One such use of the signal utilization device 34 is to provide the necessary torque to move the optical system in the necessary direction to maintain a predetermined axis pointing always either directly at, or at a fixed angle with respect to the source of radiant energy. It can be readily seen that by maintaining such an axis in space, a missile can be directed towards the source of radiant energy by a number of different navigation systems. By having the telescope arrangement shown in FIG. 1, which includes the primary mirror 14, the secondary mirror 16 and the corrector lens 18, gyroscopically mounted with the proper system of gimbals, the telescope is made substantially immune to movements of the missile proper. Arrangements for causing an optical system to track a source of radiant energy that are suitable for use with the apparatus of the present invention are fully disclosed in U.S. Pat. No. 2,713,134. The actual arrangement of the axis of rotation of the gyroscope system, which in this case is the predetermined axis to be aligned with the source, with relation to the optical axis of the telescope system, which in this case is shown to be of the Cassegrainian type, is clearly shown in FIG. 2. This type of optical system is found to be most sensitive for the amount of space required which is extremely important in guided missile applications where space is limited. By having a folded optical system the detector device and the reticle can be mounted within the telescope without imparting undue limitations upon the accuracy of the optical system. In addition, such an arrangement facilitates the relative motion between the reticle and the optical system which is needed to provide target information.

Figure 2:
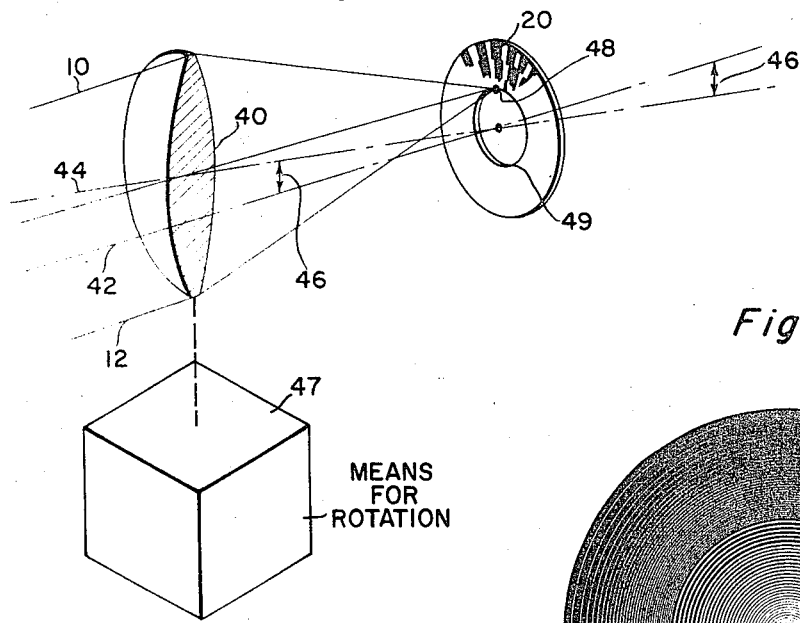
FIG. 2 is a simplified illustration of the optical system and reticle shown in FIG. 1.

In FIG. 2, the optical system shown schematically in FIG. 1 is illustrated as a lens 40, and the reticle 20 of FIG. 1 is shown enlarged to illustrate the relative position of the moving optical system with respect to the stationary reticle 20.

The axis of rotation 42 of the optical system passes through the center of and is perpendicular to the reticle 20. The optical axis 44 of the optical system 40 also passes through the reticle 20 but is not parallel to the gyro axis 42, and thus the optical system 40 is seen to be tilted with respect to the axis of rotation 42 by a predetermined angle 46. When the source of radiant energy lies upon the axis of rotation 42, the path taken by the radiant energy can be illustrated by the arrows 10 and 12. Thus, an image of the radiant energy source will be formed by the optical system 40 upon a point 48 which does not lie upon the axis of rotation 42. The reticle 20 is positioned substantially in the focal plane of the optical system 40 and thus as the optical system 40 is rotated by means for rotation 47 coupled thereto about the axis of rotation 42, the image of the radiant energy source will describe a circular path 49 about the surface of the reticle 20. Any suitable apparatus or device such as an electric motor may be utilized as means for rotation 47 as is well known by those skilled in the art. Satisfactory arrangements for rotating an optical system and for producing image nutation are fully disclosed in U.S. Pat. Nos. 2,403,066 and 2,758,502, for example. By the proper selection of the angle 46 between the axis of rotation 42 and the optical axis 44, the radius of the circular path 49 described by the image can be made any proportional part of the radius of the reticle 20. By having the radius of the circular path 49 equal to one-half of the radius of the reticle 20, which is the field stop radius, certain advantages can be gained which are clearly shown in FIGS. 3 and 4 and will be described later. The angle 46 between the axis of rotation 42 and the optical axis 44 can be termed the off-set angle, and is equal to the angular radius of the nutation circle 49 described by the image. In accordance with the present invention, the reticle is provided with a radial variation in transmissivity to give the desired response characteristics.

Figure 3A:
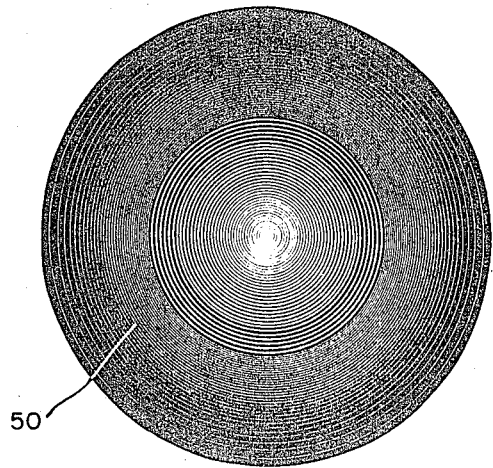
FIG. 3a illustrates one form of a radial gradation pattern which may be used in accordance with the present invention.

A radial gradation pattern 50 is illustrated in FIG. 3a which is used to vary the radiant energy transmissivity linearly from near unity at the center of the reticle to zero at the edge of the reticle, which is the edge of the field of view. The radial gradation pattern 50 is composed of a plurality of concentric circular rings of opaque material which increase in width with increasing distance from the center of the pattern, and a plurality of concentric circular rings of transparent material which decrease in width with increasing distance from the center. Thus, the radiant energy transmissivity of the pattern varies substantially linearly from unity to zero from the center to the edge along any radius. The pattern shown is for illustration only, and any pattern having a radial transmissivity variation would suffice.

Figure 3B:
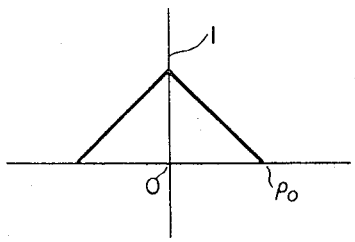

The variation in radiant energy transmissivity across any diameter of the radial gradation 50 pattern is illustrated in FIG. 3b. Relative transmissivity is plotted along the ordinate and distance from the center of the pattern is plotted along the abscissa, with the maximum transmissivity being unity and the greatest distance from the center of the reticle pattern being equal to $\rho_o$, which is the field stop radius of the optical system. A linear gradation is therefore produced about the center of the reticle.

Figure 3C:
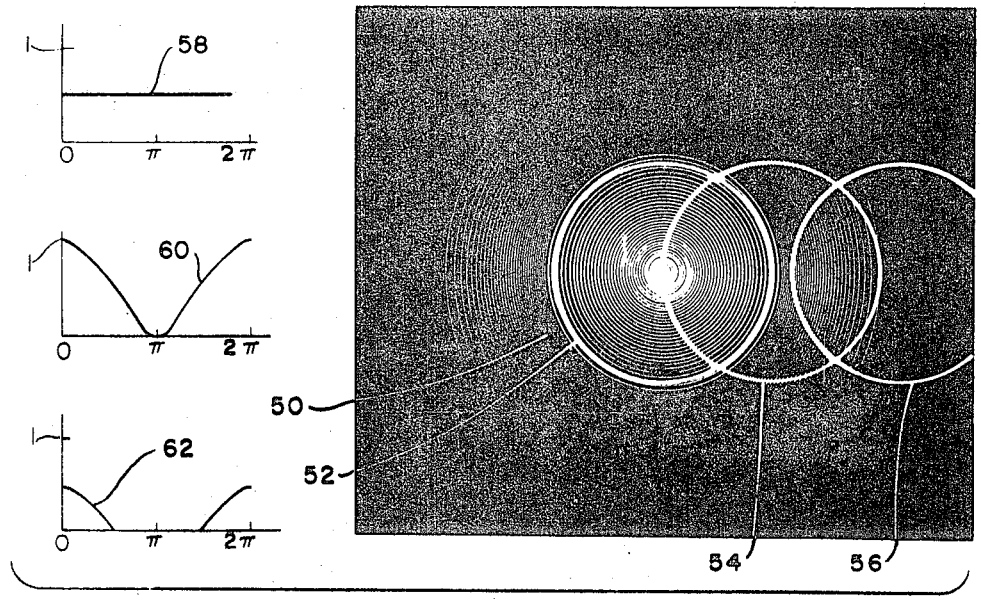
FIG. 3c shows schematically the various signal modulations produced by moving the target image in various circular paths about the surface of the radial gradation pattern.

In FIG. 3c, a plurality of circular paths 52, 54, and 56 are shown superposed upon the radial gradation pattern 50 and the respective waveforms 58, 60, and 62 are shown to illustrate the relative amount of modulation produced for various circular paths. Transmissivity versus angular position of each point of the corresponding circular path is shown, with the number 1 indicating unity transmission. The zero position for each path is taken as the most left-hand point of each path. In this particular embodiment the angular radius of the nutation circles is made equal to one-half of the field stop radius.

If the source of radiant energy lies on the axis of rotation 42, shown in FIG. 2, the circular path described by the target image will be concentric about the center of the reticle as shown by the path 52. Thus, as can be seen by the waveform 58, the intensity of the radiant energy passing through the reticle is substantially constant throughout one complete cycle. If the source of radiant energy is displaced from the axis of rotation 42 by an angle equal to $\rho_{o/2}$ where $\rho_o$ is the field stop radius, the circular path described by the image will be substantially that shown by the circular path 54, and the resulting modulation of radiant energy will be similar to that illustrated by the waveform 60, which is substantially a sinusoidal variation. If the source of radiant energy is displaced from the axis of rotation 42 by an angular distance greater than one-half of the field stop radius, a circular path such as that shown by the circle 56 will be described by the target image as the optical system rotates, and the resulting modulation will be similar to that illustrated by the waveform 62. From the three cases shown, it is readily seen that the degree of modulation of the radiant energy passing through the radial gradation pattern 50 is a function of the relative position of the circular path described by the image. It can also be seen that the radiant energy passing through the radial gradation pattern 50 will be amplitude modulated throughout the entire cycle of the rotation of the optical system as long as the angular error is less than one-half the field stop radius for the system described in which the off-set angle 46 of FIG. 2 is equal to one-half the field stop radius. When the angular error existing between the source of radiant energy and the axis of rotation 42 of FIG. 2 is greater than one-half the field stop radius but less than three halves the field stop radius, a discontinuous amplitude modulation will result, as is illustrated by the waveform 62. This is seen more clearly in FIG. 3d wherein the percent of modulation versus error angle is plotted for the case when the off-set angle of the optical system is equal to one-half the field stop radius.

Figure 3D:
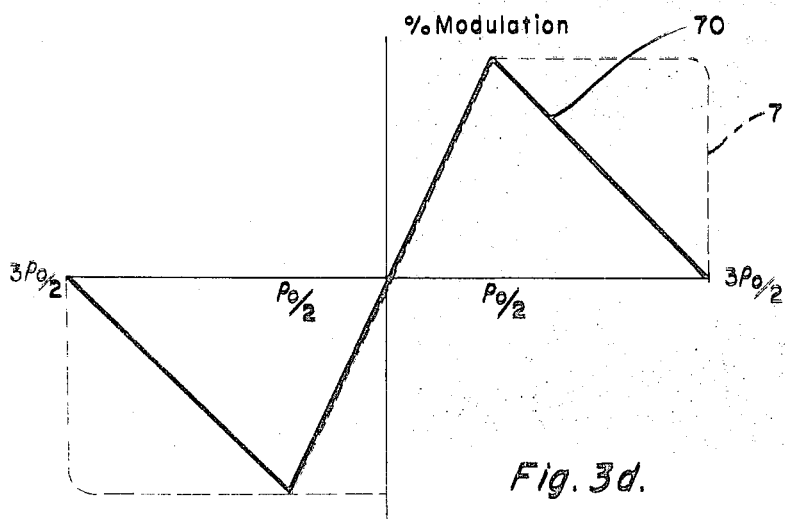
FIG. 3d is a graph illustrating the relative percent of a radiant energy modulation produced versus angular displacement of the circular path described by the target image and includes an idealized generalization of the signals which are derived by utilizing automatic gain control.

In FIG. 3d the solid line 70 illustrates the percent of modulation for error angles out to and including three halves the field stop radius. The dotted line 72 illustrates the error voltage which can be derived for various error angles by utilizing automatic gain control, which makes the angle of acquirement of a source of radiant energy much greater than the instantaneous field of view of the optical system a factor of 3 to 2 for the system described. In addition, a ratio of 3 to 1 of lock-on field to resolution angle (that is, the angle at which two sources of energy are resolved as separate targets) is obtained. This is extremely advantageous and is not found in prior systems. For the particular example shown it can be clearly seen from FIG. 3d that whenever a source of radiant energy is displaced from the axis of rotation by less than three halves of the field stop radius of the system, target acquirement can be achieved. The automatic gain control attempts to make the average value of the output signals from the detector device constant, and as long as the nutation circle falls entirely upon the reticle, the output signal will be substantially a sinusoidal signal having a constant average value. If at any time the nutation circle is displaced by more than one-half of the field stop radius, a discontinuous signal such as is illustrated by the waveform 62 results and the average value of the output signal for one cycle is decreased. Since the automatic gain control attempts to make this average value of the signal constant, the amplitude of the non-zero portion of the signal is increased, resulting in a larger signal for the servomechanism which is used to move the optical system to make the circular path described by the target image concentric about the axis of rotation. The servomechanism will thus be subjected to a large signal as soon as the image at any time falls upon the radial gradation pattern. It can also be seen from FIG. 3d that the percent of modulation is linearly related to the error angle for the central region which includes the diameter of the field stop.

The modulation produced by the radial gradation pattern should be superposed on an audio carrier modulation in order that 1, the scanning system may afford proper background discrimination, and 2, automatic gain control (AGC) can be utilized, the major function of the automatic gain control being to make the error output from the detector a function of error angle only and independent of the intensity of the incident radiation.

Figure 4A:
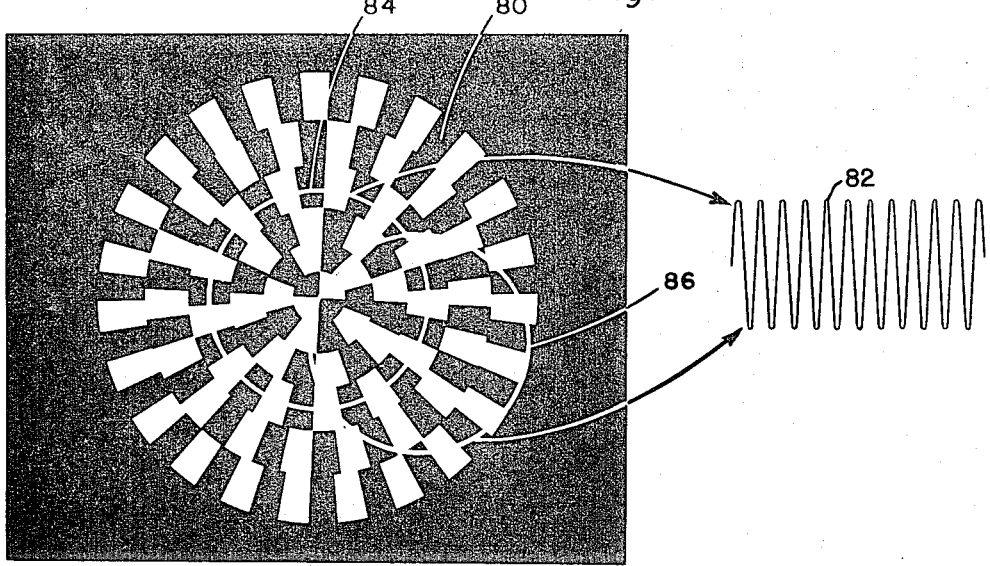
FIG. 4a shows one type of checkerboard pattern which may be utilized in accordance with the present invention and further illustrates the type of modulation produced by the movement of the target image in various circular paths about the checkerboard pattern.

The carrier is produced by the pattern 80 illustrated in FIG. 4a which can be termed a checkerboard pattern. This checkerboard pattern 80 essentially divides the area enclosed by the field stop into small regions alternating between zero and unity transmission. This second pattern 80 should produce only a single frequency carrier signal regardless of error angle, that is, the periodicity of passage of radiant energy through the reticle as the target image moves in a circular path at a constant velocity should be constant regardless of the position of the circular path upon the reticle. By proper design, such as, for example, that shown in FIG. 4a, the carrier frequency can be concentrated in a suitably narrow frequency band. It is important to limit the band width in order to reduce the amount of electrical noise passing through the system. The waveform 82 is shown to illustrate the fact that the carrier frequency is substantially constant for the two circular paths 84 and 86 described by the target image about the checkerboard pattern.

Figure 4B:
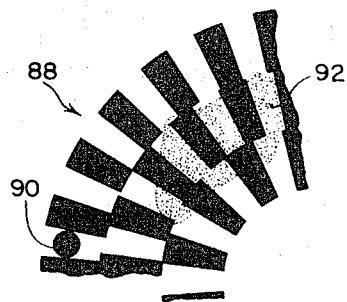
FIG. 4b is an enlargement of one portion of the checkerboard pattern shown in FIG. 4a and illustrates the method by which background discrimination is achieved.

In FIG. 4b, an enlargement of one area 88 of the checkerboard pattern 80 is shown to illustrate the method of obtaining background discrimination for backgrounds of high radiance. The shaded area 92 is shown to illustrate the image of the background which could, for example, be a cloud and the solid dot 90 illustrates the image of the target. It is quite possible, for example, that the background surrounding the target may be radiating or reflecting a total amount of radiant energy equal to or perhaps greater than the total amount of radiant energy emitted by the target. By properly designing the checkerboard pattern however, the total flux emanating from the target is concentrated entirely within an area small compared with one of the transparent (or opaque) areas and hence is effectively modulated, while the radiant energy emitted by the background is made to fall upon a plurality of such areas and hence is modulated very little as the background image is nutated over the reticle. Thus, the radiant energy emitted by the target serves as the dominating signal for the radiant energy detector.

Figure 5:
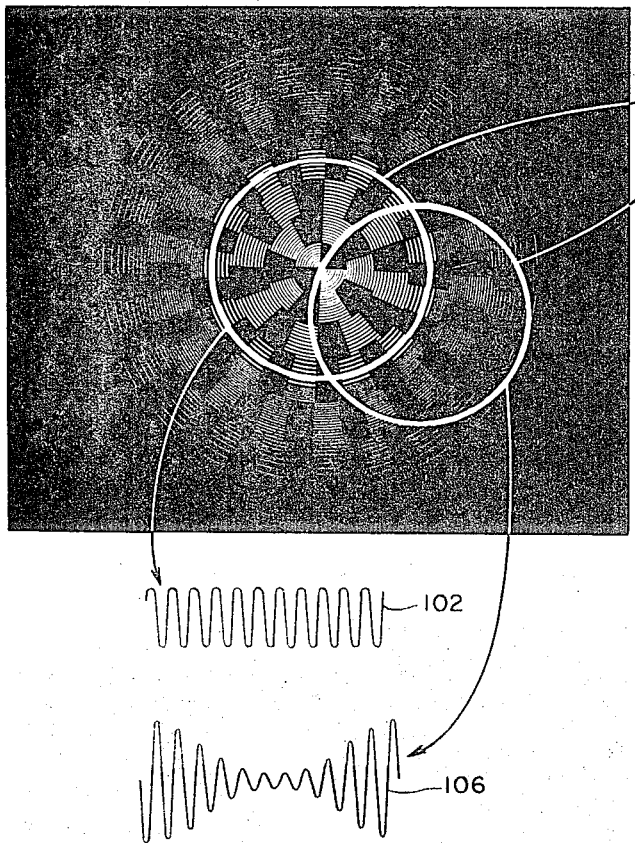
FIG. 5 illustrates the variation in radiant energy passing through the reticle which is achieved by the combined effects of the radial gradation pattern and the checkerboard pattern as the target image moves in circular paths.

In FIG. 5, the radial gradation pattern 50 is shown in superposition with the checkerboard pattern 80. When the target image describes a circular path 100 about the center of the reticle a waveform such as that illustrated in the graph 102 results. When the circular path described by the target image is displaced from the center of the reticle such as, for example, the circular path 104, the radiant energy passing through the reticle is modulated in a manner similar to that illustrated by the graph 106. The exact location of the maxima and the minima of the amplitude modulation can be determined by providing an output signal from the rotating optical system which is an indication of the exact position of the optical system at any one instant. Therefore, an exact determination of the position of the target (i.e., direction of the pointing error) is provided. This can be accomplished, for example, by placing a series of coils about the path of the rotating telescope and mounting a magnet integrally with the telescope so that as the magnet passes each successive coil an output voltage or voltage pip is produced. These pips can then be compared with the phase of the output signal from the radiant energy detector to determine the precise location of the target.

Variations of reticle transmission versus radius other than the simple linear gradient shown are possible, and can be easily designed. In particular, it may be desirable to increase the transmission near the edge of the field of view in order to increase the signal flux incident upon the detector for large error angles. Also, it may be desirable to increase the slope of the gradation in order to increase the percent modulation per degree and hence improve the accuracy or tightness of target tracking. Still other designs having specialized properties for particular application are, of course, possible. In all cases, however, the basic property of a reticle of the type disclosed here is used, that is, one having a radial transmissivity variation.

If more than one source of radiant energy falls within the field of view of the optical system, the present invention makes possible the resolution of multiple targets. For example, if there are two targets, resolution will begin to occur when the optical-system is sufficiently close to the sources to make the images fall upon the peaks of the curve 70, that is, when the angle subtended by the targets is equal to twice the radius of the field stop. For any larger subtended angles one of the sources then falls on the negative slope, unstable portion of the error curve 70 and the unit "homes" upon the other source.

Accordingly, there is a central linear portion in which the response is proportional to the pointing error; the area of target acquirement or lock-on field, that is, the region over which useful tracking signals may be obtained, extends over an angle of three times the field stop radius and is thus considerably greater than the actual field stop; and, the resolution of multiple targets or of multiple radiation sources begins when the angle subtended by the targets is equal to twice the field stop radius so that the images formed are at the peaks of the response curve.

The radiant energy tracking system provided in accordance with the present invention is capable of producing a wide variety of signal characteristics which may be utilized to maintain a predetermined axis at a constant angle, which may be zero, with respect to a source of radiant energy.

What is claimed is:

1. A radiant energy device for indicating when a predetermined axis is in line with a source of radiant energy and comprising in combination, a rotatable optical system having an axis of rotation and an optical axis for focusing an image of said source upon a plane disposed substantially perpendicular thereto, said optical system being disposed with said axis of rotation passing through a predetermined point in said plane perpendicular thereto and with said optical axis nonparallel to said axis of rotation and passing through said plane, means for rotation of said optical system coupled thereto for causing said image to traverse a circular path, a reticle disposed substantially in said plane and having a center point coincident with said axis of rotation, said reticle including means for amplitude modulating the radiant energy passing therethrough as said image traverses said circular path, the amplitude of modulation being in proportion to the displacement of the center of said circular path from the center point of said reticle, and a radiant energy detector axially aligned with said reticle and being responsive to the amplitude modulated radiant energy passing through said reticle to develop an output signal indicative of the concentricity of said circular path with respect to said axis of rotation.

2. In a radiant energy guidance unit for maintaining a predetermined axis at a fixed angle with respect to a source of radiant energy, the combination comprising a movable optical system for focusing an image of said source in a predetermined plane, means coupled to said optical system for nutating said optical system about an axis to cause said image to traverse a circular path, a reticle disposed substantially in said plane and about said axis, the radiant energy transmissivity of each area of said reticle being a function of the distance of said area from said axis, said reticle having a plurality of opaque areas disposed such that the radiant energy passing through said reticle is interrupted at a substantially constant rate as said image traverses said circular path, and a detector disposed about said axis and in the path of the radiant energy passing through said reticle for developing an output signal indicative of the concentricity of said circular path with respect to said axis.

3. A radiant energy device comprising in combination, a movable optical system for focusing radiant energy upon a predetermined plane, means coupled to said optical system for rotation thereof about a predetermined axis perpendicular to said plane to cause said focused energy to traverse a circular path of radius r that is concentric with said axis only when the source of said energy lies on said axis, a reticle of radius 2r disposed substantially in said plane and symmetrically about said axis, said reticle having a radially gradated variation in radiant energy transmissivity that varies linearly from unity to zero along the radius thereof, said reticle further including means for periodically interrupting the radiant energy passing through said reticle as said focused energy traverses said circular path, and a radiant energy sensitive detector disposed about said axis and responsive to the radiant energy passing through said reticle for providing an output signal.

4. In a device for tracking a source of radiant energy, the combination comprising a movable optical system for focusing an image of said source upon a predetermined plane, means coupled to said optical system for rotation thereof about a predetermined axis disposed perpendicular to said plane to cause said image to traverse a circular path lying in said plane, a reticle disposed substantially in said plane and intercepting said axis, said reticle providing a radiant energy transmissivity that varies as a function of the radial distance from said axis, said reticle further including opaque radial portions for periodically interrupting transmission of radiant energy as said image traverses said circular path, and a radiant energy detector responsive to the radiant energy passing through said reticle for providing an output signal.

5. In a device for determining the position of a source of radiant energy and having a movable optical system for focusing a portion of said radiant energy upon a radiant energy intensity-sensitive detector and means coupled to said optical system for nutating said optical system to cause said focused radiant energy to traverse a circular path, the combination comprising a reticle disposed between said optical system and said detector and having first means providing a radially gradated variation in radiant energy transmissivity and having second means providing periodic interruption of transmission of radiant energy as said focused radiant energy traverses said circular path, said first means including a plurality of concentric circular rings of material having a radiant energy transmissivity of unity and a plurality of concentric circular rings of material having a radiant energy transmissivity of zero alternately disposed between said rings having a transmissivity of unity, said second means comprising a plurality of radiant energy transmissive areas on the surface of said reticle and a plurality of radiant energy opaque areas on the surface of said reticle alternately arranged in a checkerboard pattern such that the periodicity of interruption of passage of radiant energy through said reticle is substantially constant for all positions of a nutation path of radiant energy focused thereon by a rotating optical system.

6. In a radiant energy source tracking device having means for focusing a portion of the radiant energy emitted by said source in a circular path upon a detector having output signals responsive to the intensity of radiant energy impinging thereon, a reticle disposed between said means and said detector and comprising a first plurality of radial portions having a radially gradated variation in radiant energy transmissivity, the transmissivity being proportional to the distance from the center of said reticle, and a second plurality of radial portions having zero transmissivity alternating with said first plurality of radial portions and so arranged that the frequency of interruption of the passage of radiant energy through said reticle is substantially constant for all positions of said circular path of focused radiant energy described thereon.

7. In a device for continuously tracking a source of radiant energy and comprising in combination: an optical system including a primary mirror for receiving energy from the source, a secondary mirror positioned to receive reflected energy from said primary mirror and a corrector lens disposed in the optical path between said mirrors; a radiant energy detector positioned to receive energy from said secondary mirror; a reticle disposed in the optical path between said detector and said secondary mirror; and means coupled to said optical system for providing motion of said optical system with respect to said reticle; said reticle having a radially gradated variation in transmissivity and having means for periodically interrupting transmission of radiant energy.

* * * * *